Patented Feb. 21, 1950

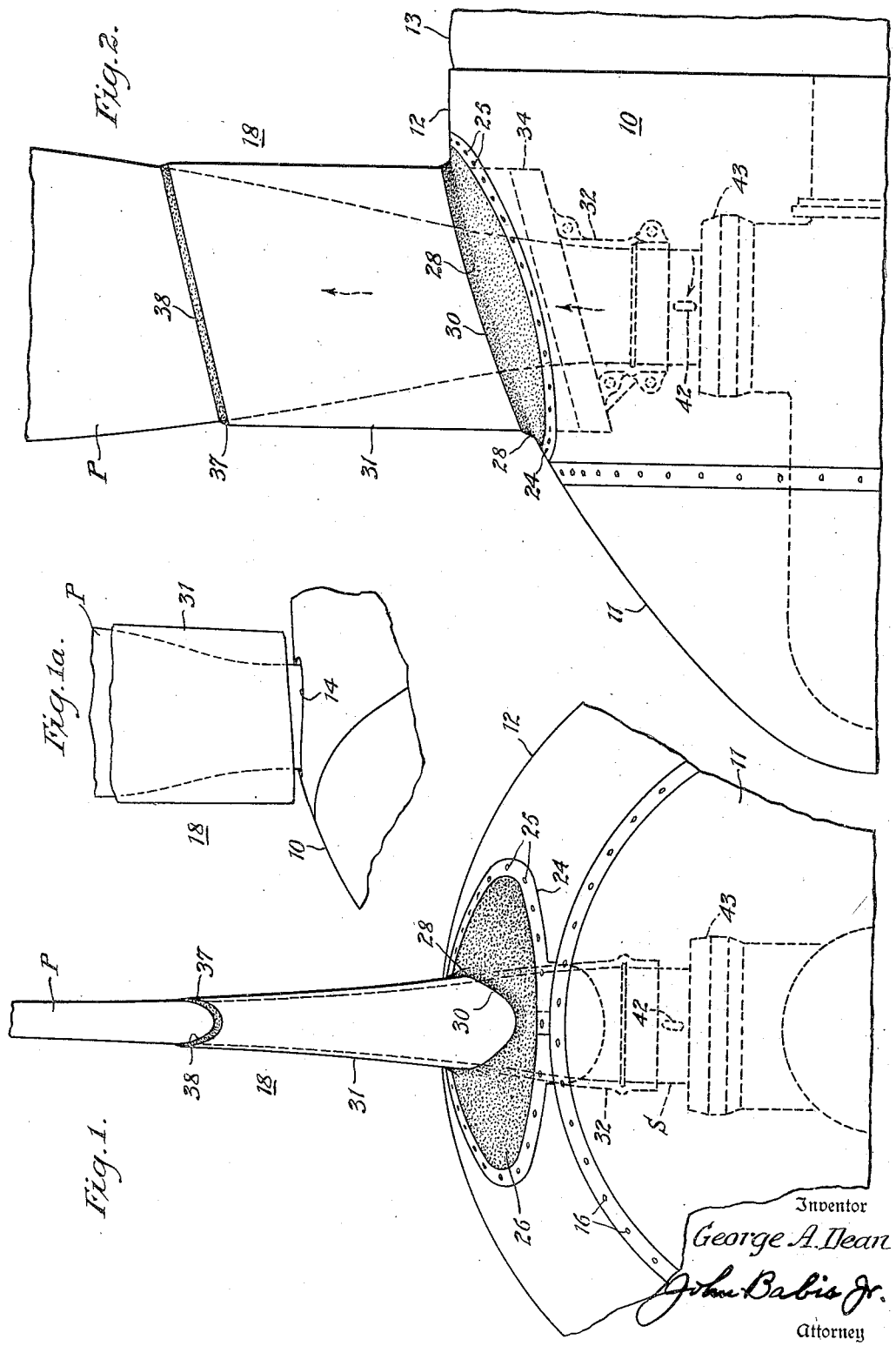

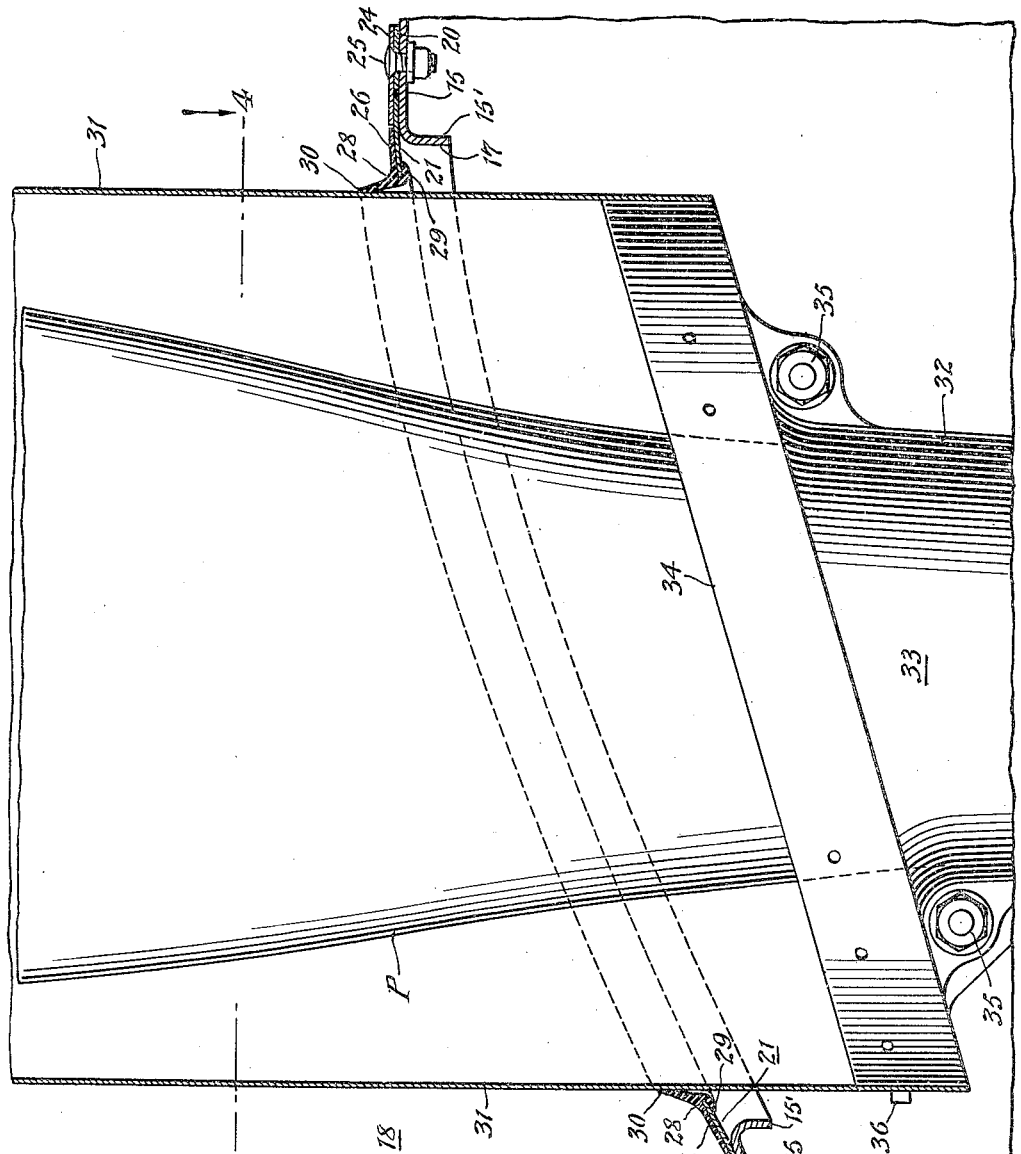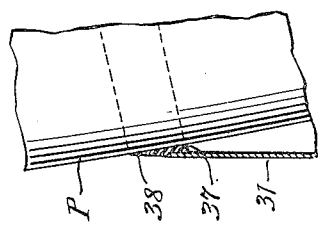

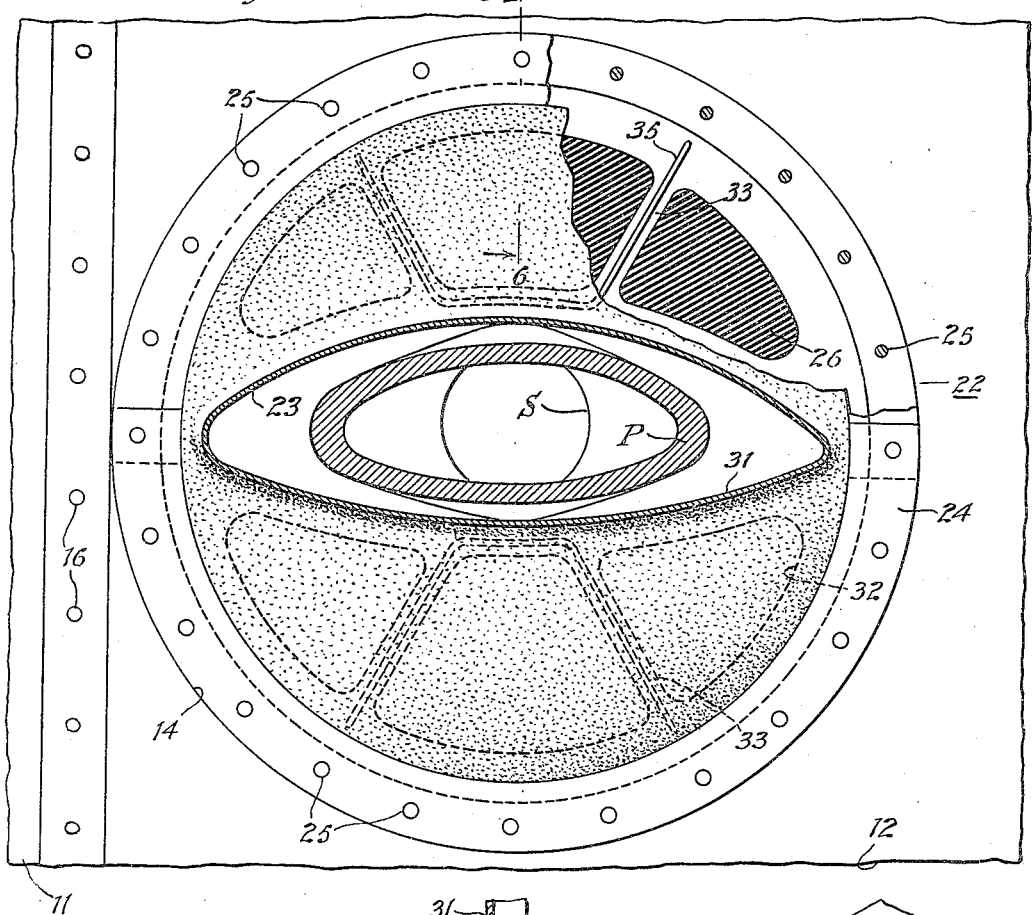
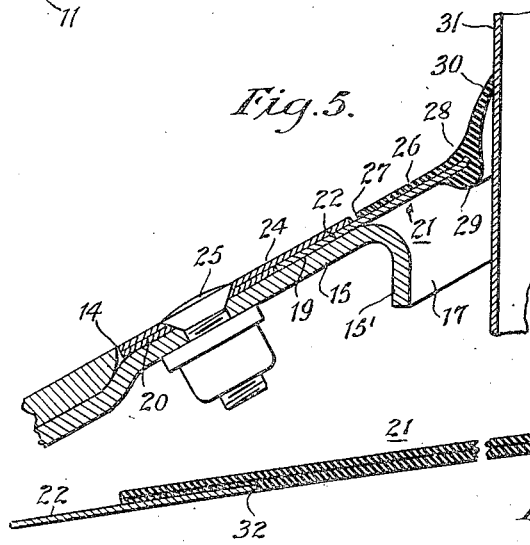
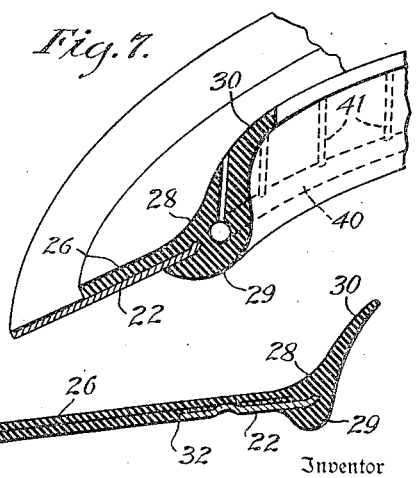

2,498,072

UNITED STATES PATENT OFFICE 2,498,072

BLADE SEAL FOR PROPELLER SPINNERS

George A. Dean, Radburn, N. J., assignor to Curtiss-Wright Corporation, a corporation of Delaware Application August 24, 1945, Serial No. 612,460

7 Claims. (Cl. 244—134)

This invention relates to spinners for aircraft propellers and more particularly to an improved spinner structure, especially adapted for controllable pitch - change propeller assemblies, wherein a spinner portion embraces each blade in close-fitting relationship while permitting pitch changing rotation of the blade relative to said spinner.

It is known that for certain engine cooling requirements, the airfoil configuration of a propeller blade is usually extended toward the inboard or root end thereof by means of a fairing or cuff member whereby the effective airfoil area of each blade is extended or lengthened to operate within the engine cowling zone. In such cases, the cuff members terminate adjacent the outer surface of a conventional spinner with clearance therebetween so that the cuff will not engage or strike the spinner surface when the blades rotate about their axis during a pitch-change operation.

Thus, such necessary clearance has heretofore resulted in a considerable gap between the spinner surface and the inboard end face of each blade cuff, with the result that such incomplete streamlining sets up objectionable air turbulence and drag in the region of said gap during operation of a propeller in flight.

Accordingly, the invention has particular reference to a closure member for the blade shank opening in a propeller spinner wherein an aperture of identical airfoil configuration is adapted for the extension therethrough, to provide sealing of a blade shank fairing or cuff member in full streamlined, close-fitting relation with the spinner in all pitch positions of the blade.

The invention has further reference to a blade seal closure member for a propeller spinner in the form of a flexible metallic disk having an aperture of airfoil configuration therein for the extension therethrough of a blade shank fairing or cuff member, the member being adapted to assume the surface shape of the spinner, the member being rotatable with the cuff member through all pitch-change movements of a propeller blade and its associated cuff member.

The invention has still further reference to closure member for a spinner opening, the member having an aperture of airfoil configuration therein, wherein the edge defining said aperture is provided or faced with a resilient gasket bearing against the surface of a propeller blade and having an internal passage therein and a plurality of relatively small ducts in communication therewith, to the exterior of the gasket. The arrangement of the ducts is such that anti-icing fluid may be passed to the passage in said gasket from a conventional slinger ring and flowed on the leading edge surface of the cuff member and propeller blade by centrifugal force upon operation of the propeller.

The invention has further reference to an improved spinner structure wherein a blade cuff sealing arrangement seals an associated spinner to enable its use as a reservoir or receptacle for hot gases, such as heated air, for de-icing purposes. In operation, heated air is passed to the spinner from a heat-exchanger and flows from the spinner to the interior of a plurality of hollow propeller blades through suitable openings in the shank walls of the blades. Heated air passes through the blades to the atmosphere by means of a slot or opening in the tip end portion of each blade whereby thermal anti-icing or de-icing of the propeller may be obtained.

The principal object of the invention is to provide an improved spinner structure for aircraft propellers which obviates turbulence and drag in regions where the blades of the propeller pass into the spinner.

A further object of the invention is to provide an improved spinner structure which presents a uniform, uninterrupted, streamlined surface between the spinner proper and the shank or portion of each propeller blade.

Another object of the invention is to provide an improved spinner structure which is usable with a variety of aircraft propeller assemblies wherein the blades differ as to length, width and planform.

With these and other objects in view, the invention resides in the novel construction, combination, and arrangement of parts, the novel features of which are set forth with particularity in the appended claims. The invention, both as to its organization and its method of operation, together with additional objects and advantages thereof, understood from the following description of a specific embodiment, when taken in connection with the accompanying drawings, in which:

Fig. 1 is a front elevational view of a fragmentary portion of a spinner constructed in accordance with the invention with a propeller blade and associated cuff member extending therethrough in full-feathered position;

Fig. 1a is a fragmentary perspective view illustrating a conventional spinner with a propeller blade and associated cuff member in operative position with respect to the outer surface of the spinner;

Fig. 2 is a side elevation of the spinner of Fig. 1 illustrating the improved spinner with a blade cuff extending therethrough in yieldably sealed relation;

Fig. 3 is an enlarged fragmentary vertical sectional view illustrating a portion of the spinner with a blade sealing closure member journaled therein and in close-fitting relation with a cuff member associated with a propeller blade;

Fig. 3a is a fragmentary sectional view illustrating the upper outboard juncture between a cuff member and a propeller blade;

Fig. 4 is a transverse sectional view taken on the line 4—4 of Fig. 3;

Fig. 5 is an enlarged fragmentary sectional view illustrating the cooperative relation between the improved spinner, and closure member, including a resilient gasket and a blade cuff member;

Fig. 6 is an enlarged sectional view taken on the line 6—6 of Fig. 4; and

Fig. 7 is a fragmentary view partly in section and illustrating a modified form of resilient gasket as associated with a blade seal closure member.

Referring more particularly to the drawings wherein similar reference characters indicate corresponding parts throughout, the improved spinner structure comprises a substantialy conical housing or shell 10 which is preferably made up of two or more sections. As shown in Fig. 2, the spinner 10 consists of a nose portion 11 and a base portion 12, the said base portion being attached to a propeller structure, generally indicated at 13, by means of a conventional spinner bulkhead not shown. The base portion 12 of the spinner 10 is provided with a plurality of relatively large clearance openings 14 in circumferentially spaced relation and adapted for the reception of a plurality of closure members in accordance with the invention and in a manner now to be described.

The base section 12 of the spinner 10 is provided with a plurality of flanged annular members or rings 15, in the form of convex metal stampings, each of which is secured on the inner side of the base section 12 by means of suitable rivets or bolts 16, with the relatively smaller opening therein in concentric relation with each clearance opening 14 whereby an annular supporting ledge, flush with the inner or underside of the base section 12 is extended into each of the clearace openings 14 for the support of a closure member hereinafter described. As clearly shown in Fig. 5, each of the rings 15 presents a flange 15' which projects into the base section 12 and defines a circular opening 17 co-centered with the axis of each propeller blade P and with an internal diameter sufficient to clear the propeller blade P and its associated cuff member 31 extending through the opening 17. The base section 12 of the spinner 10 and the flanged, convex rings 15 attached thereto, cooperate to form a plurality of circular recesses 19 and that said recesses continue the contour of the spinner toward the axial center of the aforesaid rings 15 and the propeller blades P.

In order to provide an uninterrupted, uniform spinner surface in accordance with the invention, closures are fitted to said recesses, the depth and the diameter of the recesses 19 exceeding the thickness of the closure members.

A spacer ring 20, adapted for spacing both axially and diametrically and of a thickness equal to one-half the depth of the recess 19, is positioned in each of said recesses. Seated in each of the circular recesses 19 and within the spacer ring 20 for free rotational movement relative to the spinner 10 is a closure member 21 including a flexible metallic disk 22 having a central aperture 23 therein of airfoil configuration. The closure member 21 is freely rotatably retained in its recess 19 for rotation with the blade P and cuff 31, relative to the spinner by means of a split retaining ring 24 secured to the annular member 15 by means of suitable rivets or bolts 25 extending through the member 15, the spacer ring 20 and the retaining ring 24.

With the exception of the journaled marginal edge portion of each metallic disk 22, the remaining surface of each closure 21 comprises a molded layer or covering 26 of synthetic rubber, for example, whereby the surface of each disk 22 is elevated to the level of its retaining ring 24 with the said covering of rubber presenting an annular shoulder in close proximity to the inner periphery of the retaining ring as indicated at 27.

The rubber covering 26 extends beyond the iner edge of the disk 22 defining the airfoil shaped aperture 23, in the form of a fillet 28 and an enlarged bead 29 which terminates in a substantially upstanding tapered lip 30 embracing and contacting an airfoil section 31 of a propeller blade P, in close fitting relation as clearly shown in Figs. 1, 2, 3 and 4.

In order to provide for maximum flexibility of the closure 21 and for more effectively bonding the molded rubber covering 26 to the flexible metallic disk 22, said disks 22 has areas blanked out therefrom in the form of arcuately shaped openings 32 located on opposite sides of the central aperture 23. As a result of such blanked out areas, a plurality of spokes 33 and narrow border areas 34 are formed to retain the shape of the closure while lending greater flexibility thereto. The spokes 33, remaining as a result of forming the openings 32, are preferably corrugated as at 35 to preclude the formation of permanent bends in the closure when the closure is rotated and flexed while following the convexity of the spinner 10.

While the flexible disks 22 have been illustrated as having certain areas thereof blanked out as indicated by the aforesaid openings 32, these openings may be dispensed with and that portion of each disk 22 on each side of the central aperture 23, perforated by means of a relatively large number of small, closely arranged holes as an alternate arrangement for effectively bonding or vulcanizing the aforesaid rubber covering 26 thereto.

As hereinbefore stated, the airfoil section of a propeller blade P may be extended toward the root end thereof by means of the fairing or cuff member 31. Such cuff member is, ordinarily attached to a propeller blade P by a cuff support 52 comprising a split casting adapted to form a cylindrical portion 53 and an angularly disposed collar or rim 54 of airfoil configuration. The split halves comprising the cuff support are clamped about the cylindrical shank portion of the propeller blade P by means of bolts 55 as clearly shown in Fig. 3. The cuff member 31 is completed by a split sheet metal sheathing adapted to match the airfoil configuration of the propeller blade, at its upper end, and the aforesaid collar or rim 54, at its lower end. The metal sheathing is secured to the rim 54 of the cuff support 52 by means of the screws 56 and the trailing edges of the sheathing joined together by means of a suitable hinge eye and pin arrangement not shown. A rubber gasket 37 having a faired or tapered edge 38 is preferably interposed between the upper edge of the said sheathing and the propeller blade P as clearly shown in Figs. 1 and 2.

Referring particularly to Fig. 6 a modified form of the rubber covering 26 is molded on the closure disk 22, the gasket 26 being reinforced with a suitable layer or section of reinforcing fabric 39 therewithin.

Fig. 7 illustrates a further modification of the rubber gasket 26 wherein an annular passage 40 is molded within the bead 29 with a plurality of relatively small ducts 41 normal thereto and in communication with said passage 40 and the outer surface of the upstanding lip 30, whereby an anti-icing or de-icing liquid may be flowed onto the blade cuff member 31 and the propeller blade P.

In Fig. 2 the propeller blade P is illustrated with an elongated opening or slot 42 formed in the wall of the shank S between its hub socket 43 and the aforesaid cuff support 32. The spinner 10, constructed in accordance with the invention, provides a closed housing, and thermal de-icing or anti-icing of the propeller may be readily effected in known manner by passing heated air into the spinner housing and thence into the hollow propeller blade P through said slot 42.

In Fig. 1a, there is illustrated a known form of spinner 10 with a propeller blade P of a controllable pitch-change propeller unit extending through one of the blade clearance openings 14 provided therein, and a blade cuff 31 on the blade for fairing the inboard or shank portion of the blade. From an examination of Fig. 1a, it will be readily apparent that since the cuff 31 is adapted to rotate with the blade P about its axis, relative to the spinner surface, the bottom face of the cuff 31 must be spaced from the spinner surface to avoid contact therewith during a pitch-change operation. Thus, it will be clear that such clearance space forms an objectionable gap between the cuff 31 and the spinner surface, with the result that considerable drag and turbulence is produced in the region of said gap.

In the assembly of one of the closure members 21 with a propeller blade, a blade cuff member and a spinner, a closure member 21 is first passed over the root or shank end of an uncuffed propeller blade and over the airfoil surface of the blade as far as it will go. When this has been done, the cuff structure is assembled on and clamped about the blade shank. With the blade so equipped, the usual bearing stack and retaining nut are passed over the blade shank and the blade subsequently placed in its hub socket and locked in place through the spinner openings, the base section of the spinner having been secured to the propeller hub. The closure member 21 is pulled down over the cuff member 31 and into the recess 19 formed in the spinner and the split retaining ring secured in place.

Thereafter, the spinner nose section is secured to the front end of the base section and the assembly thus completed.

While the invention has been illustrated and described in connection with a controllable pitch-change propeller unit, having a fairing or cuff member attached thereto, it is to be expressly understood that many modifications thereof are possible. For example, a spinner constructed in accordance with the invention may be utilized for streamlining the hub and blade shank of a propeller having one or more blades adapted for either fixed or variable pitch settings. Moreover, the invention is also applicable to propeller assemblies wherein the blades are of such design that auxiliary blade cuffs or fairing are not necessary by reason of the close proximity of the blade airfoil section to the root end of the blade.

The invention is also applicable to propellers of the automatic pitch-change type and also utilizable in the composite spinners of dual or contra-rotation propellers. The invention, therefore, is not to be restricted except in so far as is necessitated by the scope of the appended claims.

What is claimed is:

1. A spinner for bladed aircraft propellers, having a plurality of blade clearance openings therein comprising tracks at their edges, a substantially circular flexible closure disk member carried by and journaled in said spinner tracks at each of said openings and having an aperture of airfoil configuration therein for the extension of the respective blade through said closure member, said closure member being loosely and drivably fitted to said blade, and flexible means formed on each closure member flush with said spinner for extending said spinner surface to an airfoil section of the associated propeller blades.

2. A spinner having a plurality of openings therein, means forming an annular channel about each of said openings, a flexible closure member rotatably disposed in each of said channels and having an aperture of airfoil configuration therein, said closure members being adapted to assume the surface shape of said spinner upon rotational movement relative to said spinner, and flexible means formed on each of said closure members flush with said spinner surface for extending said surface to the edge defining said aperture.

3. A spinner for aircraft propellers having a plurality of radial clearance openings therein, an annular track bordering each opening, a flexible disk-like closure member rotatable relative to and journaled in said track at each of said openings and having a central aperture of airfoil configuration for the extension therethrough of a propeller blade, and a member secured to each of said closure members flush with the spinner surface extending to and terminating in a feathered edge loosely engaging the airfoil surface of said propeller blade.

4. A spinner for aircraft propellers having a plurality of cutout openings therein, means forming an annular channel about each of said openings in concentric relation therewith, a closure member disposed in each of said channels for free rotational movement relative to said spinner and having an aperture of airfoil configuration therein adapted for the extension of a propeller blade through said aperture, and a non-metallic member secured to each of said closure members flush with the surface of said spinner for extending said surface to and beyond the edge defining said aperture, said non-metallic member terminating in a tapered upstanding lip adapted to embrace the airfoil section of a propeller blade.

5. In a propeller blade to spinner connection in aircraft, in combination, a blade, a spinner having an opening through which the blade passes, a closure ring fitted at its exterior edge in the inner edge of said opening and having an inside edge spaced from the surface of said blade, and a continuous resilient gasket embracing said blade having a peripheral channel within which is fitted the inside edge of said ring, said gasket having an inner tapered lip engaging the surface of said blade.

6. In a propeller blade to spinner connection in aircraft, in combination, a blade, a spinner having an opening through which the blade passes, a closure ring fitted at its exterior edge in the inner edge of said opening and having an inside edge spaced from the surface of said blade, and a continuous resilient gasket embracing said blade having a peripheral channel within which is fitted the inside edge of said ring, said gasket having an inner tapered lip engaging the surface of said blade, said gasket having therein a conduit embracing the blade and having therein a plurality of ducts opening at their ends to said conduit and to the outer surface of said lip.

7. A substantially conical spinner for a controllable pitch aircraft propeller, said spinner having a circular opening through which a blade of the propeller passes, the border of said opening being circular and including means forming a circular track, a flexible disk-like closure member journalled at its edge in said track, said member having a central opening through which the propeller blade passes, the shape of said opening corresponding to the cross sectional profile of the propeller blade in the blade zone intercepted by the envelope of the spinner, and yieldable filleting means secured to said member and disposed in said member opening engaging the propeller blades, said closure member being turnable in its track by and with said blade, and having freedom for longitudinal movement along said blade as the blade and member jointly rotate about their respective axes.

GEORGE A. DEAN.

REFERENCES CITED

The following references are of record in the file of this patent:

UNITED STATES PATENTS

| Number | Name | Date |
| --- | --- | --- |
| 2,083,992 | Hall | June 15, 1937 |
| 2,210,190 | Stanley | Aug. 6, 1940 |
| 2,289,400 | Woods | July 14, 1942 |
| 2,329,606 | Goodman | Sept. 14, 1943 |
| 2,402,114 | Clair | June 11, 1946 |
| 2,421,841 | Lowy | June 10, 1947 |
| 2,440,115 | Palmatier | Apr. 20, 1948 |
| 2,440,394 | Cockerill | Apr. 27, 1948 |

FOREIGN PATENTS

| Number | Country | Date |
| --- | --- | --- |
| 518,873 | Great Britain | Mar. 11, 1940 |
| 882,261 | France | Feb. 22, 1943 |